United States Patent

[11] 3,580,547

| [72] | Inventor | Franklyn J. Amorese<br>Hilton, N.Y. |
|------|----------|-------------------------------------|
| [21] | Appl. No. | 832,929 |
| [22] | Filed | June 13, 1969 |
| [45] | Patented | May 25, 1971 |
| [73] | Assignee | Sybron Corporation<br>Rochester, N.Y. |

[54] PACKAGE, LIQUID FLUSHED, STEADY BEARING ASSEMBLY
10 Claims, 3 Drawing Figs.

[52] U.S. Cl. ..................................................... 259/23,
259/107, 308/36.1
[51] Int. Cl. ..................................................... B01f 7/20,
F16c 1/26
[50] Field of Search .......................................... 259/1, 6, 7,
8, 22—24, 43—45, 106—108; 308/36.1

[56] References Cited
UNITED STATES PATENTS

| 3,149,888 | 9/1964 | Lennon .......................... | 259/107X |
| 3,443,794 | 5/1969 | Peterson ........................ | 308/36.1X |
| 3,489,469 | 1/1970 | Stratienko ..................... | 259/107X |

Primary Examiner—William I. Price
Attorney—Theodore B. Roessel

ABSTRACT: Disclosed is a liquid flushed, steady bearing assembly which can be mounted as a package to the exterior of a mixing vessel to support the free end of an agitator shaft protruding outwardly from the vessel so that the wear bearing of the assembly is serviceable from outside of the vessel. The flushing liquid is discharged radially from the assembly and into the vessel in a single stream from between a stationary member and a rotating member located within the vessel, wherein the spacing between these members can be controlled in part from outside of the vessel.

Patented May 25, 1971

3,580,547

INVENTOR.
FRANKLYN J. AMORESE
BY
ATTORNEY 3,580,547

PACKAGE, LIQUID FLUSHED, STEADY BEARING ASSEMBLY

BACKGROUND OF THE INVENTION

The present invention relates to a steady bearing assembly of the type used by the chemical industry to support the free end of an agitator shaft. More specifically, the present invention relates to a liquid flushed steady bearing assembly which can be attached to the exterior of a mixing vessel to support the free end of an agitator shaft protruding from the vessel. The entire steady bearing assembly of the present invention is removable and replaceable as a unit from outside the vessel, the bearing of the assembly is serviceable from outside of the vessel and the assembly has an adjustable component within the vessel to direct the flow of flushing fluid radially from the bearing with the adjustment of this member also being effected by means outside of the vessel.

In the chemical industry, the mixing of various chemical compounds, such as polymers, is done in relatively large vessels with capacities up to 20,000 gallons. The agitators of these vessels are relatively long and are usually suspended from the top of the vessel and extend substantially the full length of the vessel with the agitator being rotated by a motor and drive gearing at the top of the vessel. Due to the relatively great length of these agitator shafts, some provision must be made to support or steady the free end of the shaft which extends downwardly within the vessel to some point above the bottom of the vessel. The need for supporting the agitator free end is well known in the art and it is sufficient for purposes of the present invention to say that without such a support, the suspended shaft would be unable to withstand the stresses and buffeting produced in the mixing operation. The support for the free end of the agitator shaft is known in the art as a "-steady bearing."

Steady bearing assemblies of the prior art have usually been mounted within the vessel on a bracket or similar support attached to the interior of the vessel. Having this assembly mounted to the interior of the vessel gives rise to problems of servicing, repairing and/or replacing all or a portion of the assembly should any component fail. Thus, in the prior art, a vessel had to be provided with a relatively large opening to permit the passage into the vessel of the entire steady bearing assembly and its support. Also, since the entire bearing assembly was located within the vessel, it was necessary either to remove the entire assembly from the vessel whenever service, repair or replacement was needed or to enter the vessel through a manhole to make the repair.

Further, where the materials being mixed were abrasive and adhesive, as is the case with polymers, any accumulation of polymer on the bearing would greatly reduce the life of the entire bearing assembly. Accordingly, the steady bearing assemblies of the prior art were provided with a means to flush the bearing surfaces of the assembly with a suitable fluid to prevent the accumulation and buildup of polymer. Such flushing systems of the prior art introduced the flushing liquid into the bearing assembly so that the liquid would flow axially between the bearing and the shaft before being axially discharged from the shaft into the vessel. However, this is objectionable in that this method of axial flushing does not eliminate the buildup of polymer over the ends of the bearing lying in planes normal to the axial flow of the flushing liquid.

SUMMARY OF THE PRESENT INVENTION

In the present invention, the free end of the agitator shaft is extended through the vessel wall, a liquid flushed steady bearing assembly being provided which includes a bearing housing mounted to the exterior of the vessel for supporting the fixed wear bearing member about the free end of the shaft. A wear sleeve which extends into the vessel and is fixed to the shaft comprises the rotating bearing member. The fixed wear bearing, being outside of the vessel, is not exposed to the polymer and is readily accessible so that it can be easily serviced or replaced when worn. Both the housing and sleeve and the components these members support comprise a package which can be removed and replaced as a unit from outside of the vessel so that the entire steady bearing assembly can be removed and replaced without entering the interior of the vessel.

The steady bearing assembly of the present invention further includes a planar seat fixed to the housing and exposed to the interior of the vessel. The sleeve portion of the steady bearing assembly which extends into the vessel carries an axially adjustable bushing having one end opposed to this seat. With this arrangement, a stream of flushing liquid will be directed radially across the seat from between the bushing and the seat as the sleeve rotates to sweep the seat clean of polymer. The adjustment of this bushing is also accomplished from outside of the vessel.

OBJECTS OF THE INVENTION

It is an object of the present invention to provide a packaged assembled steady bearing assembly for mixing vessels which is attached to the exterior of the vessel and which can be removed and replaced as a unit.

Another object of the present invention is to provide a steady bearing assembly for a mixing vessel wherein the wear bearing can be serviced from outside of the vessel.

A still further object of the present invention is to provide a liquid flushed steady bearing assembly wherein the flushing liquid can be discharged into the vessel radially from the bearing assembly.

A yet further object of the present invention is to provide a liquid flushed steady bearing assembly having a seat within the vessel wherein the flushing liquid is discharged into the vessel in a single stream which sweeps radially across this seat as the shaft rotates.

These and other objects, advantages and characterizing features of the present invention will become more apparent upon consideration of the following detailed description thereof when taken in connection with the accompanying drawings.

DESCRIPTION OF THE PREFERRED EMBODIMENTS

Figure 1:
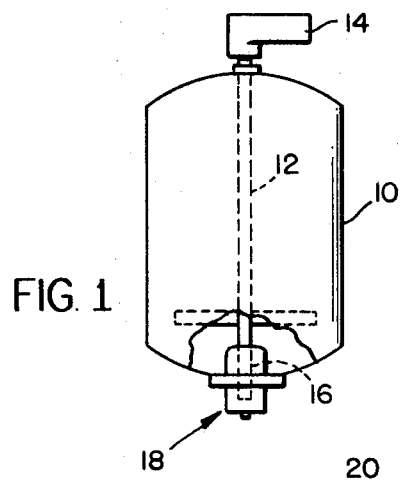
FIG. 1 is a schematic view of a mixing vessel and agitator shaft utilizing the wear bearing assembly of the present invention.

Referring to the drawing, FIG. 1 illustrates a mixing vessel 10 having an agitator shaft 12 for mixing the contents of the vessel. Any suitable drive means 14 known in the art can be used to rotate the agitator shaft. As stated hereinabove, the usual practice in the art is to have shaft 12 terminate above the bottom of the vessel and to mount the steady bearing assembly on brackets or other similar support members which are fixed to the interior of the vessel bottom. In the present invention, however, shaft 12 is of a length greater than the height of the mixing vessel so that the free end 16 of the shaft protrudes through the bottom of the vessel. The steady bearing assembly of the present invention generally indicated at 18 then, is affixed to the exterior of the vessel bottom and about the protruding or free end of the shaft.

Figure 2:
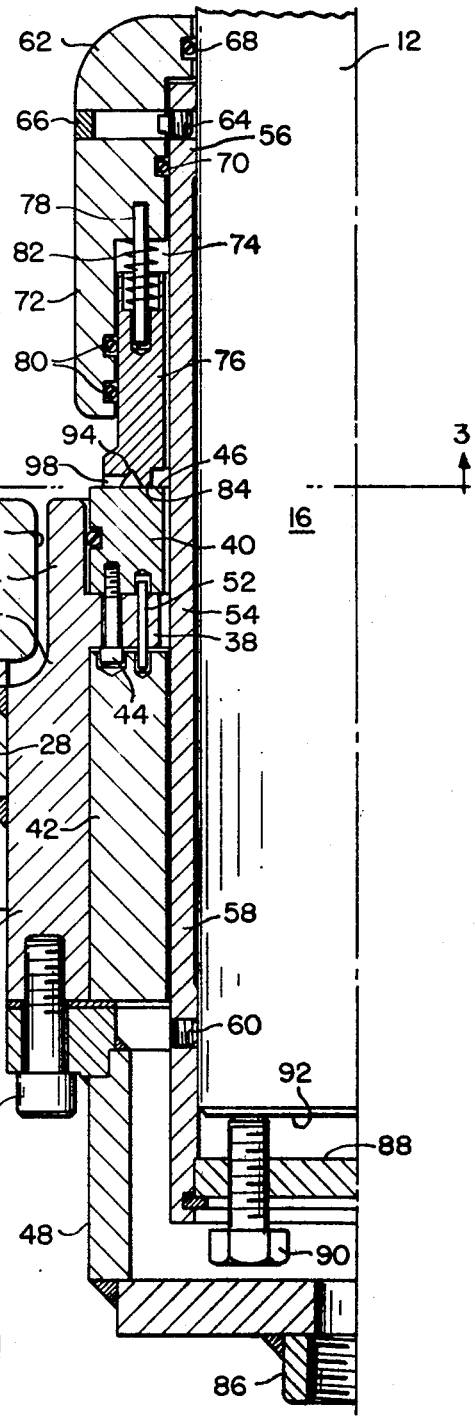
FIG. 2 is a view in section of the steady bearing of the present invention attached to the bottom wall of the vessel and about the free end of an agitator shaft.

Turning to FIG. 2, the reference 20 represents a portion of the vessel bottom wall and the reference 22 represents the opening therein through which protrudes the free end 16 of the shaft. Steady bearing assembly 18 is shown to include a housing member 24 which is fixed to the exterior of the vessel bottom by any suitable means such as a clamp ring 26, which engages a housing flange 28, and the nuts and bolts 30 which attach the clamping ring and therefore the housing to the vessel. Any suitable gasket 32 is disposed between flange 28 and the vessel bottom to prevent leakage from the vessel through opening 22. Housing 24 includes a neck portion 34 which extends into opening 22, a body portion 36 located outside of the vessel, and an internal annular rib 38. Fixed within the housing are a seat member 40 and wear bearing 42. Seat member 40 rests on and is fixed to rib 38 by any suitable means such as bolts 44 and has one planar face 46 which is exposed to the environment of the vessel and which lies within the vessel in a plane substantially normal to the axis of rotation. Wear bearing 42, however, is located below rib 38 so that the rib separates the bearing from the seat member, the bearing being held within the housing by a housing cover 48 which in turn is attached to the housing by bolts 50. Bearing 42 is prevented from rotating with shaft 12 by pins 52 which extend through rib 38.

The rotating portion of steady bearing assembly 18 includes a wear sleeve 54 slidably disposed over the free end 16 of the shaft. Sleeve 54 extends into the vessel so that the sleeve has an upper portion 56 within the vessel and a lower portion 58 extending outside of the vessel. The sleeve can be fixed to rotate with shaft 12 by a setscrew 60 through the lower sleeve portion 58.

Also rotating with shaft 12 and fixed to upper sleeve portion 56 by a setscrew 64 is a cup-shaped member 62. The opening in member 62 through which the setscrew extends is closed by a weld as indicated at 66 to isolate setscrew 64 from the materials within the mixing vessel. Any suitable seals such as O-rings 68 and 70 are used to seal member 62 about shaft 12 and sleeve 54 respectively.

The wall 72 of cup-shaped member 62 together with upper sleeve portion 56 define therebetween an annular space 74. Disposed in this annular space is a floating throttle bushing 76 which is pinned at 78 for corotation with the cup, sleeve and shaft, otherwise, the throttle bushing is free to move axially with respect to these members. A spring 82 is provided within the annular space 74 to bias the throttle bushing towards seat member 40 so that the lower face 84 of the throttle bushing will abut against the face 46 of the seat. Any suitable means such as O-rings 80 may be used to seal between cup wall 72 and the throttle bushing 76.

In cases where the materials that are mixed within the vessel are highly adhesive and abrasive, such as polymers, it is essential to prevent the buildup of polymer at the interface between faces 46 and 84 as such a buildup would reduce the life of the assembly. As stated hereinabove, in order to prevent such a buildup, the steady bearing assembly is flushed with any liquid compatible with the materials being mixed. In the case of the present invention, housing cover 48 is provided with a connection 86 for attachment to any suitable liquid source for introducing the flushing liquid into the housing. In order to prevent the flushing liquid from flowing between sleeve 54 and shaft 12, the lower portion 58 of the sleeve is provided with a cover plate 88 and, as shown in FIG. 2, a bolt 90 is threaded through this cover plate to abut against the end 92 of the shaft for purposes set out hereinbelow.

Accordingly, the flushing liquid, introduced through connection 86, flows into the housing, between wear bearing 42 and wear sleeve 54 and is discharged radially from the assembly to the interior of the vessel from between faces 46 and 84. Since bushing face 84 rotates over seat face 46, added impetus is imparted to the flushing liquid by centrifugal force to flush the liquid across seat face 46.

Figure 3:
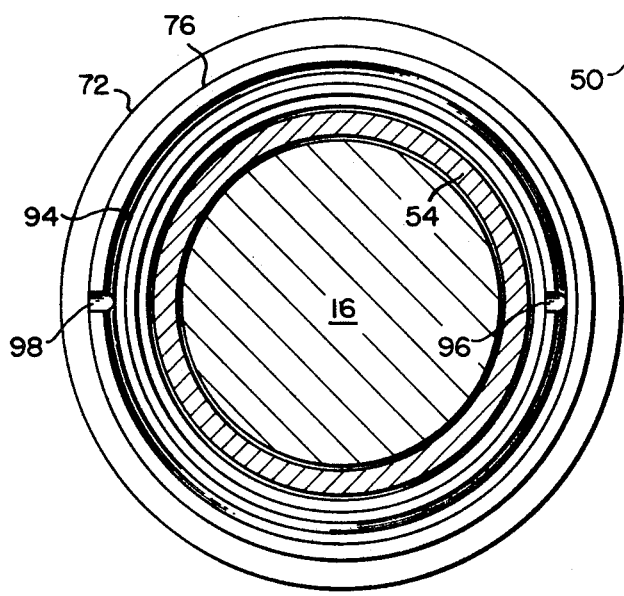
FIG. 3 is a view taken along lines 3-3 of FIG. 1.

In order to insure that seat face 46 is swept clean of polymer and to prevent the adhesion and accumulation of polymer at the interface between faces 46 and 84, FIGS. 2 and 3 show that face 84 of throttle bushing 76 is provided with an annular V-groove 94, an inlet groove 96 which permits the fluid to flow from the interior of the throttle bushing into the V-groove 94, and an outlet groove 98 disposed approximately 180° from the inlet which connects the V-groove to the exterior of the throttle bushing. These grooves 94, 96 and 98 lie substantially in the plane of the bushing face. With this arrangement and with throttle bushing 76 rotating with the shaft and abutting seat face 46, it should be appreciated that the grooves 96, 94 and 98 define a tortuous passage to permit the flushing liquid within the throttle bushing to pass in a single stream under the influence of centrifugal force through inlet 96, around V-groove 94 and out outlet 98. Having a minimum of outlet grooves 98 permits a concentrated stream of flushing fluid to sweep across and clean the seat face 46 to clear and maintain the area immediately adjacent the throttle bushing and seat member free of produce accumulation.

As stated hereinabove, spring 82 urges throttle bushing 76 against seat 46. However, in order to compensate for any wear of bushing face 84, means is provided outside of the vessel to adjust the bearing force between faces 46 and 84 which lie inside the vessel. In this respect, when it is desired to increase the bearing pressure, bolt 90 is simply turned against shaft end 92 to draw sleeve 54 in a direction to compress spring 82. When it is desired to decrease the bearing force, bolt 90 is turned in a direction to reduce the compression of spring 82.

As stated hereinabove, one feature of the steady bearing assembly of the present invention is that it can be removed and replaced as a unit as opposed to conventional steady bearings which are assembled element by element about the free end of an agitator shaft. In this respect, to remove a worn or defective unit, housing cover 48 is removed and setscrew 60 is turned to release sleeve 54 from the shaft. Nut and bolts 30 are then removed which permit the entire steady bearing assembly to be withdrawn from about the shaft through opening 22. A new assembly can then be placed into operation as a unit simply by sliding sleeve 54 over the shaft and replacing nut and bolts 30, tightening setscrew 60 to hold the sleeve against the shaft and replacing housing cover 48. It should be apparent that this ability to remove and replace the steady bearing as a unit has a distinct advantage over steady bearings of the prior art which must be assembled part by part within the vessel about the agitator shaft.

Further, since wear bearing 42 is located outside of the vessel, it is possible in the present invention to replace this bearing without the necessity of removing the entire assembly from the vessel. In this respect, simply removing housing cover 48 will permit bearing 42 to slip from the housing. A new bearing can then be inserted and the cover replaced to hold the bearing in position. This also provides a distinct advantage over the prior art in that the wear bearing 42 is serviceable from outside of the service vessel and it is unnecessary to enter the vessel or remove the entire steady bearing assembly from about the shaft when it becomes necessary to replace only the wear bearing.

A still further advantage of the steady bearing assembly of the present invention is that throttle bushing 76 can be adjusted from outside of the vessel to insure optimum flow of flushing liquid from the interface between surfaces 46 and 84. This is accomplished in the manner set out hereinabove simply by removing housing cover 48 and turning bolt 90 to raise or lower sleeve 54 and cup-shape member 62. In this respect, when a large flow between these surfaces is desired to flush across the entire interface area, the bearing pressure of the throttle bushing against surface 46 is decreased so that the pressure of the flushing liquid is able to move the throttle against its spring bias to create a space or gap between surfaces 46 and 84. On the other hand, in cases where a single high-pressure stream is preferred, the bearing pressure can be increased to keep surfaces 46 and 48 butted together so that a single high-pressure stream of liquid will issue from groove 98 and sweep across the seat face as the shaft rotates.

Thus, it will be appreciated that the present invention accomplishes its intended objects providing a steady bearing assembly which can be removed and replaced as a unit or package from outside of the mixing vessel and which is attached to the exterior wall of the vessel thereby eliminating need for any bracket or support member within the vessel. Since the actual wear bearing of the assembly of the present invention is readily accessible from outside of the vessel, this bearing can be replaced when it is worn without the need for entering the vessel or removing the entire steady bearing assembly from its attached position. Further, the steady bearing of the present assembly has an adjustable throttle bushing 76 which to some extent can be used to control the flow of flushing liquid between the surfaces 46 and 48.

While a preferred embodiment of the present invention has been described, it should be apparent that various modifications can be made therein without altering the basic concept of the invention as described. For example, where it is necessary to flush large quantities of liquid through the bearing assembly, the wear bearing 42 may be provided with a plurality of axial passages to increase the cross-sectional area of the flow path. Further, while wear bearing 42 and seat 40 have been shown as separate components separated by rib 38, it could be possible to eliminate the rib and provide wear bearing 42 and seat 40 as a unitary element fixed in housing 24. However, such a configuration is not preferred as removal of such a unitary element for replacement would create an opening into the vessel thereby risking loss or contamination of the products within the vessel.

Having thus described the invention in detail, what I claim as new is:

1. A package, liquid flushed, steady bearing assembly, adapted for external attachment to a mixing vessel to steady the free end of a driven shaft protruding outwardly through an opening in a wall of the vessel, said assembly comprising:
    a. a housing adapted for attachment to the exterior of said vessel over and about the outwardly protruding free end of said shaft;
    b. a wear bearing within said housing and outside of said vessel;
    c. a wear sleeve adapted to slidably mate and corotate with the free end of said shaft, said wear sleeve having a first portion extending into said vessel and a second portion extending outwardly from said vessel through said wear bearing;
    d. means for introducing a flushing liquid into and through said housing about said sleeve; and
    e. means carried by said second sleeve portion for discharging said liquid radially from said assembly into said vessel.

2. An assembly as set forth in claim 1 further comprising:
    a. a seat member carried by said housing having one substantially planar face lying within said vessel in a plane generally normal to the axis of rotation of said shaft; and
    b. an axially movable bushing carried by said first sleeve portion, said bushing being adapted to corotate with said sleeve and having one face opposed to said seat face, said flushing liquid passing from about said sleeve radially outward into said vessel from between said opposed faces.

3. An assembly as set forth in claim 2 further comprising means carried by said first sleeve portion for axially urging said bushing toward said seat face to bring said bushing face and seat face into abutment, said bushing provided with grooves substantially in the face thereof for conducting the flow of flushing liquid between said abutting bushing and seat faces.

4. An assembly as set forth in claim 3 in which said grooves comprise an annular groove, an inlet groove extending radially outward from the inner periphery of said bushing face and communicating with said annular groove, and an outlet groove communicating with said annular groove and extending radially outward from said annular groove to the outer periphery of said bushing face said grooves defining a tortuous fluid passage between said abutting seat and bushing faces wherein flushing liquid flows into said inlet groove around said annular groove and out said outlet groove as a single stream which sweeps across said seat face as said bushing rotates.

5. An assembly as set forth in claim 2 including means moving said bushing axially with respect to said sleeve for controlling the spacing between said seat face and said bushing face comprising:
    a. a cup-shaped member attached to said first sleeve portion, said sleeve and the wall of said cup-shaped member having an annular space therebetween for receiving said bushing;
    b. resilient means in said annular space for urging said bushing toward said seat;
    c. means carried by said second sleeve portion and accessible from outside of said vessel for moving said sleeve axially with respect to said shaft to increase or decrease the compression of said resilient member, whereby decreasing the compression of said resilient member will permit the pressure of said flushing liquid to move said bushing against said resilient means and increase the spacing between said opposing bushing and seat faces.

6. A liquid flushed steady bearing as set forth in claim 1 wherein said housing comprises:
    a. a necked portion extending into said vessel opening;
    b. a body portion extending outside of said vessel for receiving said wear bearing;
    c. a flange on said body portion for connecting said housing to the exterior of said vessel; and
    d. a removable cover attached to said housing for holding said wear bearing in said body portion, said cover being removable to permit replacement of said wear bearing.

7. A liquid flushed steady bearing assembly for external attachment to a mixing vessel to steady the free end of a driven shaft protruding outwardly through an opening in a wall of the vessel, said assembly comprising:
    a. a housing adapted to placement about said protruding shaft end and attachment to the exterior of said vessel, said housing including a necked portion for insertion into said vessel opening, a body portion extending outside of said vessel, and an internal rib extending radially inward about the inner periphery of said housing;
    b. a wear bearing carried within the body portion of said housing;
    c. means releasably attached to said housing for releasably retaining said wear bearing in said housing body portion;
    d. an annular seat member carried within the neck portion of said housing and having one face lying in a plane substantially normal to the axis of said shaft and exposed to the interior of said vessel, said seat member being fixed to said rib wherein said rib is interposed between and separates said seat and wear bearing;
    e. a wear sleeve adapted to slidably mate and attach to said protruding shaft end, said wear sleeve having a first portion extending into said vessel and a second portion extending outside of said vessel and within said wear bearing;
    f. axially movable bushing member carried by and rotating with said first sleeve portion and presenting a face opposed to said seat face; and
    g. means for introducing a flushing liquid into said housing body and between said wear bearing and second sleeve portion, said liquid being radially discharged from adjacent said first sleeve portion between said opposed faces and into said vessel.

8. An assembly as set forth in claim 7 wherein said opposing faces are in an abutting relationship and the face of said bushing member is grooved to define a channel for said flushing liquid between said abutting seat and bushing faces.

9. An assembly as set forth in claim 8 wherein the grooves in said bushing face define a tortuous channel for said liquid and includes an annular groove intermediate the inner said outer peripheries of said bushing face, an inlet groove extending radially outward from the inner periphery of said bushing face to communicate with said annular groove, and an outlet groove communicating with said annular groove and extending radially outward to the outer periphery of said bushing face.

10. An assembly as in claim 9 comprising a single outlet groove displaced approximately 180° from said inlet groove wherein flushing liquid passes into said inlet groove about said annular groove and out said outlet groove in a single stream which sweeps across said seat face as said bushing rotates.